March 31, 1959     J. DE MARIO     2,879,613
TEA BAG TAGS
Filed April 24, 1957
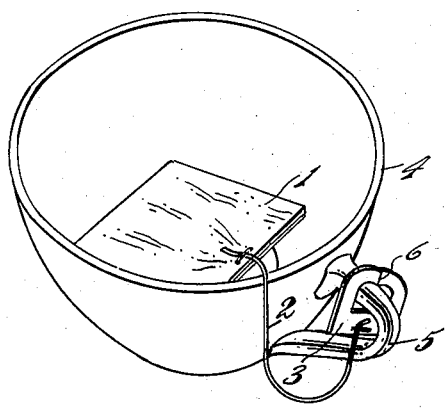
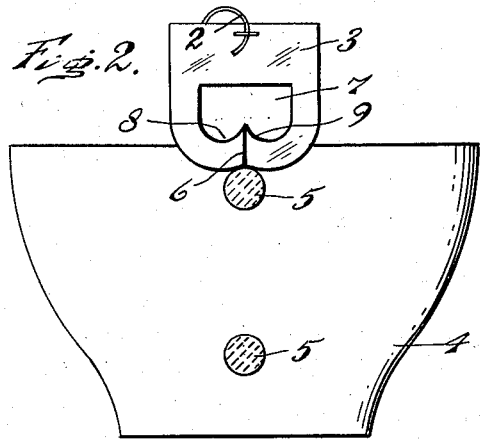
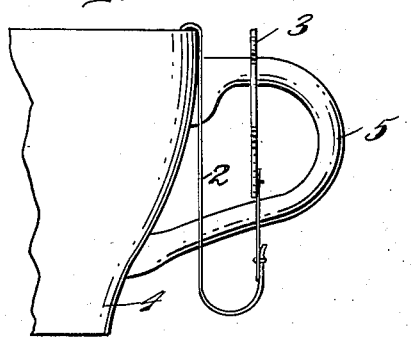
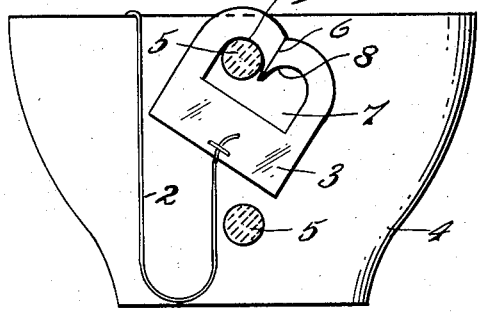
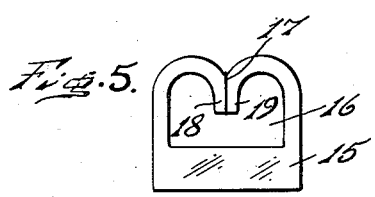
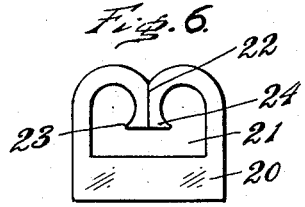
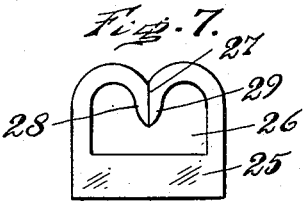
INVENTOR
*Joseph De Mario*
BY
*Herbert S. Fairbanks*
ATTORNEY

United States Patent Office 2,879,613
Patented Mar. 31, 1959

2,879,613

TEA BAG TAGS

Joseph De Mario, Barrington, N.J.

Application April 24, 1957, Serial No. 654,755

1 Claim. (Cl. 40—2)

In order to provide for an individual cup of tea, it is customary to pack the tea in bags to which one end of a string is connected, the other end of the string being fixed to a tag which overhangs the outer side of the cup when the bag is placed in a cup to which hot water has been added.

The tag serves as a grasping portion when the tea bag is to be raised and lowered in the water in the cup, and it often happens that the tag slips back into the tea in the cup.

The object of this invention is to devise a novel tea bag tag which will interlock with the handle of the cup and thus prevent the tag from slipping into the cup.

A further object of the invention is to devise a novel tea bag tag which when moved downwardly over the handle of the cup and then released will automatically turn upside down to reverse its position on the handle and interlock with the handle, thereby preventing the tag from slipping into the liquid in the cup.

A further object of the invention is to devise a novel tea bag tag for attachment to a string connected with a tea bag, said tag having an offcenter opening with a slit extending from the opening through a side of the tag, and with the walls of the opening at opposite sides of the slit being curved whereby when the position of the tag is reversed on a cup handle the portion of the outer wall of the opening at one side or the other of the slit will contact with the cup handle and interlock therewith.

With the foregoing and other objects in view which will hereinafter clearly appear in the detailed description and appended claim, my invention comprehends a novel tea bag tag connectible with a string to a tea bag.

For the purpose of illustrating the invention, I have shown in the accompanying drawings preferred embodiments of it which I have found, in practice, to give satisfactory and reliable results. It is however to be understood that these embodiments are typical only, and changes within the scope of the claims, may be made in the contour of the opening and the extent of the locking area of such walls at opposite sides of the tag slit.

Figure 1 is a perspective view of a tea bag tag embodying my invention in assembled condition with the handle of a cup.

Figure 2 is a side elevation of the cup with the handle in section with the tag above the handle and about to be passed over the handle.

Figure 3 is a side elevation of the cup with the tag passed over the handle.

Figure 4 is a side elevation of the cup with the handle in section and showing a position the tag can assume on the handle when the operator releases his grasp on the tag.

Figures 5, 6 and 7 are plan views of other embodiments of the invention.

Similar numerals of reference indicate corresponding parts.

Referring to the drawings:

Referring first to the embodiment seen in Figures 1 to 4, inclusive, a tea bag 1 has one end of a string 2 fixed to it in any desired manner, the other end of the string being attached in any desired manner to my novel tea bag tag 3.

The tea bag is placed in a cup 4 containing hot water or to which hot water is to be added and the tag is interlocked on the cup handle 5 in the manner clearly shown in Figure 4.

The tag 3 has a slit 6 opening through its wall opposite to the point of attachment of the string and leading from an opening 7 which extends offcenter of the tag so that the heavier portion of the tag will be at the string end. The walls 8 and 9 of the opening at opposite sides of the slit are rounded or curved to receive the cup handle, as shown at 8 and 9 with the inner walls at the slit projecting into the opening so as to contact at least one half of the cup handle. The walls of the slit are normally in contact. The inner wall of the opening is flat and the side walls are parallel.

The outer inner wall of the chamber and a portion of the inner side walls together with the merging side walls of the inward projection form hemispherical supporting walls at opposite sides of the projection, one of such supporting walls contacting at least one half the circumference of a conventional tea cup handle when the tag is applied and turns upside down.

In Figure 5, a tag 15 has an opening 16 with a slit 17, the walls 18 and 19 of the slit projecting inwardly of the opening to contribute to form curved walls which will contact more than one half the diameter of the cup handle.

In Figure 6, I provide a more positive lock of the tag with the handle, the tag 20 having an opening 21 with inner flat wall and parallel side walls. A slit 22 extends outwardly from the opening and the walls 23 and 24 have their inner faces curved or rounded.

In Figure 7, a tag 25 has an opening 26 with a flat inner wall and parallel side walls and is provided with a slit 27 which extends through the inwardly projecting portions 28 and 29. These portions 28 and 29 have curved walls which terminate in a blunt rounded point, while in Figures 5 and 6 the portions opposite the slit terminate in flat walls.

In the operation, the user grasps the solid, inner portion of the tag and moves it downwardly over the cup handle, the side portions opposite the slit spreading apart so that the tag passes from the position seen in Figure 2 to that seen in Figure 3, the operator releasing his grasp on the tag. Since the portion of the tag next to the string is heavier, the tag when released will turn upside down into the position seen in Figure 4 and be seated in one of the outer rounded recesses of the opening as 8 or 9.

The operation of the tags shown in Figures 5 to 8 inclusive is the same as that already described with variations in the amount of the locking action on the cup handle.

The tags are made of thin paper, plastic or any other desired material and usually have advertising matter printed on them.

When the operator takes hold of the string and dips the tea bag up and down in the hot water to increase the strength of the tea, the tag remains interlocked with the handle and cannot pass into the cup.

I have described my invention as used with the handle of a cup but it is to be understood that the tag is intended to interlock with the handle of a tea pot or other utensil, and while I have referred to tea other soluble material packed in a bag may be employed with the bag connected with a construction of tag as herein disclosed.

Having thus described the invention, what I claim as new and desire to secure by Letters Patent is:

The combination with a tea bag, of a string having one end secured to the tea bag, and a tag to which the other end of the string is secured, said tag having an offcenter opening adjacent the side to which the tag is secured, with a central projection from the inner wall of the tag extending into said opening, said projection having a slit extending to said opening from the periphery of the tag, a portion of the side walls and inner wall of the opening and side walls of the projection forming hemispherical supporting walls at opposite sides of said projection to contact at least one half of the circumference of a tea cup handle, and said tag having outer converging edges adjacent the slit so that when the tag is pushed downwardly on the handle and moved through the slit and released the tag will turn upside down and will be guided by the projection to cause the tag to be supported on one or the other of said inner supporting walls.

References Cited in the file of this patent
UNITED STATES PATENTS

| | | |
|---|---|---|
| 1,214,864 | Woodruff | Feb. 6, 1917 |
| 1,429,465 | Tolg | Sept. 19, 1922 |
| 1,430,641 | Ginn | Oct. 3, 1922 |
| 1,672,518 | Ensko | June 5, 1928 |
| 2,609,629 | Hubbard | Sept. 9, 1952 |
| 2,625,758 | Shepherd | Jan. 20, 1953 |
| 2,796,686 | Waters | June 25, 1957 |